(12) United States Patent
Andre

(10) Patent No.: US 6,796,784 B1
(45) Date of Patent: Sep. 28, 2004

(54) FORMING EQUIPMENT FOR POLYMERIZATION OF SHAPED PARTS IN COMPOSITE MATERIAL

(75) Inventor: Joël Andre, Bougival (FR)

(73) Assignee: EADS CCR, Paris Cedex (FR)

( * ) Notice: Subject to any disclaimer, the term of this patent is extended or adjusted under 35 U.S.C. 154(b) by 0 days.

(21) Appl. No.: 09/937,854

(22) PCT Filed: Apr. 14, 2000

(86) PCT No.: PCT/FR00/00968

§ 371 (c)(1),
(2), (4) Date: Sep. 28, 2001

(87) PCT Pub. No.: WO00/62993

PCT Pub. Date: Oct. 26, 2000

(30) Foreign Application Priority Data

Apr. 16, 1999 (FR) .............................. 99 04801

(51) Int. Cl.⁷ .............................................. B29C 43/56
(52) U.S. Cl. .................... 425/195; 425/387.1; 425/388; 425/389
(58) Field of Search ................................ 425/195, 383, 425/387.1, 388, 389

(56) References Cited

U.S. PATENT DOCUMENTS

| | | | |
|---|---|---|---|
| 4,065,340 A | * 12/1977 | Dickerson | 156/154 |
| 4,591,400 A | 5/1986 | Fradenburgh et al. | |
| 5,281,388 A | * 1/1994 | Palmer et al. | 264/571 |
| 5,709,893 A | * 1/1998 | McCarville et al. | 425/389 |
| 5,817,269 A | 10/1998 | Younie et al. | |
| 5,820,894 A | * 10/1998 | Kreutzer | 425/389 |
| 5,939,013 A | * 8/1999 | Han et al. | 264/510 |

* cited by examiner

Primary Examiner—Robert Davis
Assistant Examiner—Joseph S Del Sole
(74) Attorney, Agent, or Firm—Thelen Reid & Priest, LLP

(57) ABSTRACT

Shaping tool for the polymerisation of profiled parts (P) made of a composite material, comprising a mould (10) formed of several unconnected elements (14, 16), a flexible and leak tight bladder (24) capable of pushing a part blank into contact with the walls of a cavity (12) formed in the mould (10), and devices (36) such as flexible walls or the leak tight bladders capable of holding elements (14, 16) of the mould (10) in contact with each other. The result is a part (P) with outside surfaces free of geometric and dimensional defects.

13 Claims, 4 Drawing Sheets

FORMING EQUIPMENT FOR POLYMERIZATION OF SHAPED PARTS IN COMPOSITE MATERIAL

TECHNICAL DOMAIN

This application is a national phase of PCT/FR00/00968, filed Apr. 14, 2000, and International Application No. 99/04801, which was filed on Apr. 16, 1999, and was not published in English.

The invention relates to a shaping tool, intended for use in the manufacture of profiled parts made of a composite material for final polymerisation of these parts. It is particularly applicable to the manufacture of parts with a U or L cross-section.

STATE OF THE ART

According to one conventional manufacturing technique, profiled parts made of a composite material, and particularly parts with a U or L cross-section, are usually made by laying up fabrics or layers of fibers impregnated with a thermosetting or thermoplastic resin in order to obtain a part blank with the required shape and dimensions, and then polymerising this part blank in an autoclave.

Normally, the final polymerisation step is done using a shaping tool comprising a rigid metallic mould in the shape of a punch on which the part blank is placed. The tooling also comprises a leak tight bladder that covers the outside of the part blank and inside which a vacuum is created in order to create the shape of the blank by pushing it against the punch shaped mould.

This tooling is placed in an autoclave in order to apply the temperature and pressure cycle necessary for polymerisation of the resin used.

This cycle includes a temperature rise during which the metallic mould expands. When polymerisation of the resin is complete, the tooling and the part contained in it are gradually cooled down to ambient temperature. During cooling, the shrinkage of the hardened part is very much less than the shrinkage of the punch shaped metallic mould. Therefore, the part is easily removed from the mould when the tooling is extracted from the autoclave.

This conventional production technique is satisfactory in some cases. However, it is not suitable when the profiled parts to be made have a calibrated outer surface, in other words when this surface must be perfectly free of geometric faults and when its dimensions must be accurately controlled. This requirement occurs particularly when the functional surfaces of the parts to be made are the outside surfaces of these parts.

In the conventional technique described above, the outside surface of the profiled parts is shaped directly by the flexible leak tight bladder. Therefore, uncontrollable geometric and dimensional defects will necessarily be present.

PRESENTATION OF THE INVENTION

The purpose of the invention is precisely a shaping tool, intended for the polymerisation of profiled parts made of a composite material, with an innovative design that enables it to make parts in which the outer surface is practically free of geometric and dimensional defects, and which has mechanical characteristics similar to those obtained with existing tools without fundamentally modifying the polymerisation technique.

According to the invention, this result is obtained by means of a shaping tool, for the polymerisation of profiled parts made of a composite material comprising a rigid mould, and shaping means suitable for pushing a part blank into contact with the rigid mould, the tooling being characterized in that the rigid mould is formed of several elements without any connection between them, holding means being provided to keep the said elements normally in contact wit with each other so as to define a cavity inside which the part blank can be fitted, while enabling the said elements to separate during a cooling phase following polymerisation of the blank.

According to the invention, the outer surface of the part is calibrated using a hollow mould, with a cavity in which the part blank is placed.

Furthermore, the shrinkage of the mould that occurs during the cooling phase after polymerisation has no effect on the mechanical properties of the part. Production of the mould in several independent elements means that these elements can be separated from each other during cooling. Therefore, the part is not affected by any excessive stresses due to shrinkage of the mould. Furthermore, keeping the elements forming the mould in contact with each other throughout the polymerisation time guarantees that the required shape and dimensions will be obtained.

In one preferred embodiment of the invention, the support means comprise means of applying pressure on an outside face of at least one of the elements of the mould, in order to push this element towards an adjacent element.

Preferably, although not necessarily, the outside face of this element is approximately parallel to an inside face delimiting the cavity from the said element or a counter form placed inside this element.

In the preferred embodiment of the invention, the elements of the rigid mould are placed in a rigid envelope. The pressure application means then comprise at least one flexible wall connected onto the envelope in a leak tight manner, or a leak tight bladder fixed on the envelope. The flexible wall or the leak tight bladder is laid out so that it is forced under pressure into contact with the outside face of the corresponding element.

When the part to be made has a U-shaped cross-section, the rigid mould forms a cavity that also has a U-shaped cross-section. Furthermore, the mould comprises a central element materializing the bottom of the cavity and two end elements materializing the sides of the cavity. The support means then normally keep the end elements in contact with the side edges of the central element.

In this case, the pressure application means comprise either two flexible walls that can be pressurized to come into contact with the outside faces of each of the end elements, or two leak tight bladders that can be forced into contact with the said outside faces under the effect of pressure output by an external pressure source.

When flexible walls are used, they are subjected to the external pressure.

Furthermore, the cavity may have a variable cross-section or it may be uniform over its entire length.

BRIEF DESCRIPTION OF THE DRAWINGS

We will now describe different embodiments of invention as non-limitative examples, with reference to the attached drawings in which.

DETAILED DESCRIPTION OF SEVERAL PREFERRED EMBODIMENTS OF THE INVENTION

Figure 1:
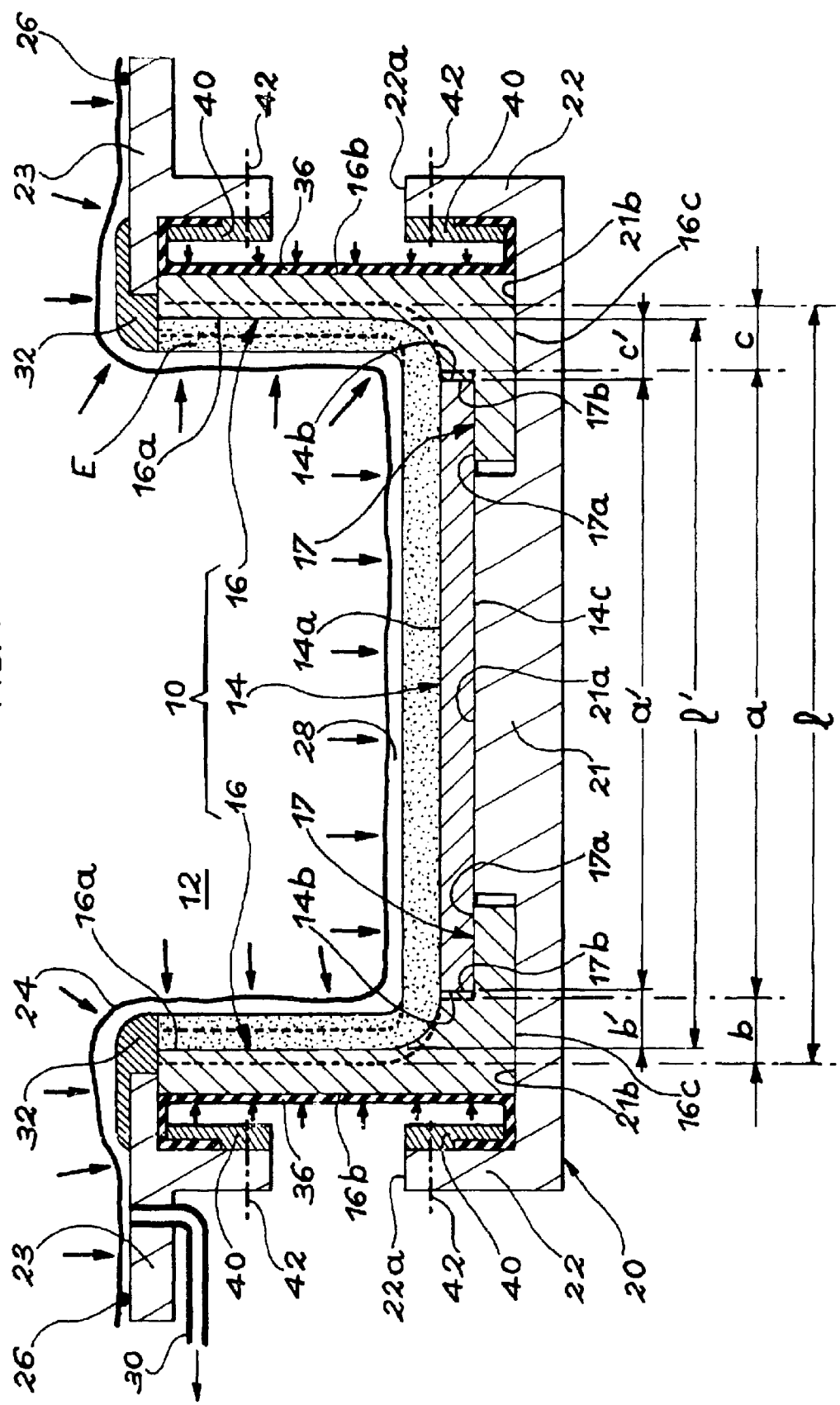
FIG. 1 is a cross-sectional view showing a tooling conform with the invention applied to the manufacture of a profiled part with a U-shaped section in the state in which it was before polymerisation of the blank (shown in solid lines) and when the polymerisation temperature is reached (discontinuous line)
Figure 2:
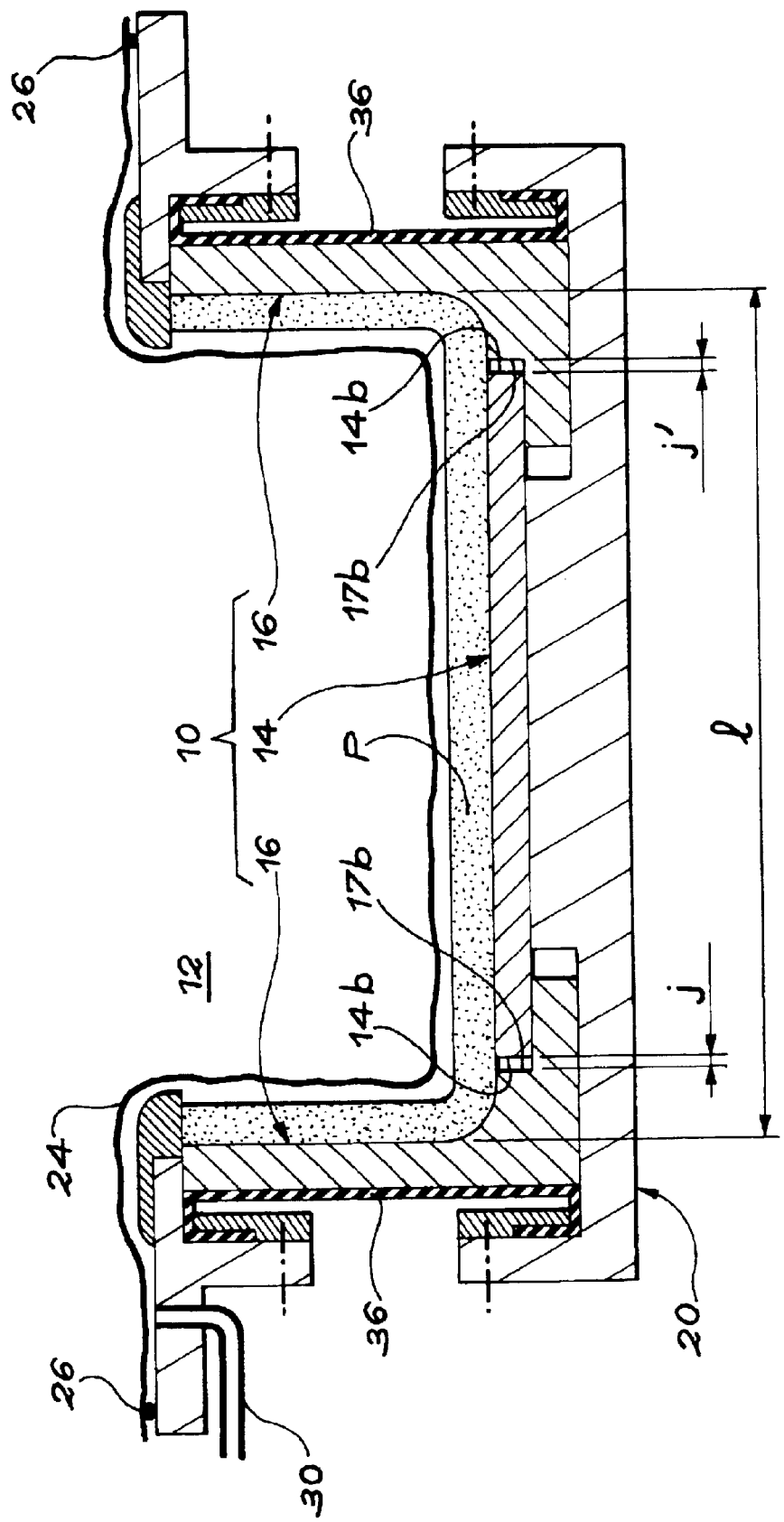
FIG. 2 is a cross-sectional view comparable to FIG. 1, showing the state of the tooling after the part has cooled.

FIGS. 1 and 2 show a first embodiment of the shaping tool according to the invention applied to the production of a part with a U-shaped section, in the initial state of the tooling (shown in continuous line in FIG. 1), at the end of polymerisation (shown as a broken line in FIG. 1) and after cooling (FIG. 2).

According to the invention, the tooling comprises a rigid metallic mould 10 that delimits a cavity 12 on the inside, open on its upper surface. The cavity 12 has a rectangular section in this embodiment although this is in no way limitative.

More precisely, in the embodiment shown, the rigid metallic mould 10 comprises a central element 14 and two end elements 16.

The central element 14 is in the form of a plane rectangular plate in this case, the upper face 14a of which materializes the bottom of the cavity 12. The side edges 14b of the plate are perpendicular to its upper face 14a.

The end elements 16 are identical to each other and the section is approximately in the shape of an L. The flange forming the base of the L is thicker than the central element 14, and there is a notch 17 complementary to a lateral part corresponding to the central element on its inside, such that the said lateral part fits into this notch. More precisely, each of the notches 17 formed in the end elements 16 comprises a bottom 17a with which the lower face 14c of the central element 14 comes into contact, and a plane side 17b with which the corresponding side edge 14b of the central element 14 normally comes into contact as shown in FIG. 1. Under these conditions, the inside face 16a of each of the end elements 16 materializes the sides of the cavity 12.

More precisely, the inside face 16a of each of the end elements 16 comprises a plane main part, in this case perpendicular to the top face 14a of the central element 14, and a connecting part with a quarter circle section that connects the said plane part to the upper face 14a without any discontinuity.

Each of the end elements 16 also comprises a plane outer face 16b parallel to the main plane part of the inner face 16a.

The elements 14 and 16 of the metallic mould 10 are made from materials chosen taking account particularly of the dimensions of the part to be made. Thus, in the case of case of a part with relatively small dimensions, the central element 14 may for example be made of steel and the end elements 16 may be made of a light alloy. On the other hand, in the case of a part with relatively large dimensions, the central element 14 may for example be made of an alloy with controlled expansion and the end elements 16 are made of steel.

The elements 14 and 16 of the metallic mould 10 are placed inside a rigid envelope 20, which is also metallic. In particular, the envelope 20 may be made of steel.

More precisely, the envelope 20 comprises a stepped bottom part 21 with a thick central part, provided with a plane upper face 21a on which the plane lower face 14c of the central element 14 of mould 10 is supported. The thinner side parts at the bottom of the envelope 20 comprise plane upper faces 21b that support the end element 16 of the mould, such that these elements can slide laterally under the effect of the expansion of the central element 14, as will be understood later.

More precisely, each of the end elements 16 is supported on a plane lower face 16c on the plane upper face 21b of the corresponding lateral part of the bottom 21 of the envelope 20.

The envelope 20 also comprises two side walls 22 that surround the end elements 16 of the mould, while being sufficiently separated from these elements to enable them to move towards the outside under the effect of expansion of the central element 14 as described above. In the embodiment shown in FIGS. 1 and 2, each of the sidewalls 22 of the envelope 20 comprises an opening 22a that enables the external atmosphere to penetrate between this wall and the corresponding external element 16.

The envelope 20 also comprises an upper wall 23, fully open above the cavity 12, and the lower face of which is free to slide thus cooperating with the upper edge of each of the end elements 16 and the mould 10, to help keep these elements inside the envelope 20.

The tooling according to the invention also comprises means of shaping a part blank E that can be placed in the cavity 12 of mould 10. These shaping means comprise a flexible and leak tight bladder 24 that entirely covers the inside face of the part blank E and extends sideways on each side of the cavity 12, above the upper wall 23 of the rigid envelope 20. A sealing ring 26 is inserted between the bladder and the rigid envelope 20 around the entire periphery of the leak tight bladder 24, so as to trap the part blank E within a closed volume 28 also delimited by mould 10.

Means are provided for connecting the closed volume 28 to a vacuum source. In the embodiment illustrated in FIGS. 1 and 2, these means comprise a tube 30 opening up above the upper wall 23 of the envelope 20 inside the closed volume 28.

In order to prevent the flexible and leak tight bladder 24 from coming into contact with sharp edges that could damage it prematurely, two rules 32 are placed on the part of the top edge of each of the end elements 16 not covered by the top wall 23 of the envelope 20. Each of the rules 32 is prolonged above the top edge of the side corresponding to the part blank E.

According to the invention, the tooling also comprises support means, by which each of the end elements 16 of the mould 10 is normally kept in contact with the side edge 14b corresponding to the central element 14 as shown in FIG. 1.

In the embodiment illustrated in FIGS. 1 and 2, these support means comprise means of applying a pressure on the outside 16b of each element 16, to force these elements towards the central element 14. In this case, the pressure application means consist of two flexible leak tight walls 36, for which the peripheral edges are fixed in a leak tight manner onto the envelope 20, the central part of which is kept in contact with the outside face 16b of the corresponding end element 16, under the action of the pressure outside the mould and allowed to enter through openings 22a.

More precisely, each of the flexible leak tight walls 26 is located in the space formed in this case between the corresponding end element 16 and the side wall 22 adjacent to the envelope 20. The peripheral edges of each of the flexible and leak tight walls 36 are fixed inside the side walls of the envelope, around openings 22a, for example using plates 14 fixed to the said side walls by fastener means such as screws or bolts, illustrated by chain dotted lines 42 in FIG. 1.

When making a profiled part with a U-shaped cross-section, the first step is to make a part blank E by laying up fabric or layers of fibres impregnated with a thermosetting or thermoplastic resin. The part blank E is then placed in the cavity 12 of the mould 10 and the rules 32 and 34 are put into place. Finally, the operator installs the flexible and leak tight bladder 24 in the manner described and illustrated. The tooling is then ready to be placed in an autoclave in which the part blank is subjected to the polymerisation cycle corresponding to the resin used.

When the tooling containing the part blank E is at ambient temperature, and before the beginning of polymerisation, the distance l' (FIG. 1) separating the inside faces 16a of the end elements 16 of the mould 10 is equal to the width a' of the central element 14 of the mould, plus the distances b' and c' that then exist between the inside face 16a and the side edges 17b held in contact with the side edges 14b of the central element 14 by the flexible leak tight walls 36 and 38.

In order to apply polymerisation, the volume 28 containing the part blank E is subjected to a vacuum through tube 30. On the other hand, the outside surfaces of the flexible and leak tight bladder and the walls 36 are still affected by the pressure inside the autoclave. Consequently, the part blank E is pressed into contact with the surfaces 14a and 16a of the cavity of mould 12 by the bladder 24 and the end elements 16 are kept in contact with the side edges 14b of the central element 14 by the flexible and leak tight walls 36.

When the temperature imposed by the polymerisation cycle is increased, the pressure increases accordingly. However, the elements 14 and 16 of mould 10 are still kept in contact, because the pressure applied on the inside faces of the two sides of the part blank E through the bladder 23 is compensated by the action of the same pressure on the flexible leak tight walls 36.

On the other hand, the temperature rise causes a gradual expansion of the different parts of the tooling and particularly elements forming part of the mould 10. This expansion continues until polymerisation of the part blank E. The distance l between the inside faces 16a of the end element 16 of mould 10 is therefore greater than the corresponding distance l' at ambient temperature as is shown deliberately exaggerated in FIG. 1. This distance l determines the distance that will separate the outside faces of the two sides of the part that is finally obtained. Therefore, the dimensions a', b' and c' characteristic of the elements 14 and 16 of the mould at ambient temperature are determined such that the sum of the corresponding dimensions a, b and c at the polymerisation temperature is equal to the required distance l.

When the part P is polymerised and therefore becomes rigid, the tooling is cooled gradually. The result is a shrinkage of the part P (FIG. 2) and elements forming part of the tooling. However, the coefficient of expansion of the composite material part is much less than the coefficient of expansion of the metallic elements of the tooling, and consequently the shrinkage of the metallic elements of the tooling is much greater than the shrinkage of the parts. In particular, the shrinkage of elements 14 and 16 forming the mould 10 is such that a clearance j, j' is created between each of the side edges 14b of the central element 14 and the side edges 17b of the notch 17 formed in the corresponding end element 16. This characteristic according to the invention means that the shrinkage of the mould will not damage the part P thus obtained.

The flexible walls 36 also compensate for expansion and shrinkage of the envelope 20.

Consequently, the tooling conform with the invention can be used to make a profiled part P from a composite material, in which the outside surfaces have perfectly controlled dimensions and surface conditions.

In the embodiment that has just been described with reference to FIGS. 1 and 2, the manufactured parts has a U-shaped section and its two sides, or flanges, are perpendicular to the bottom of this part. In this case, the outside faces 16b of the end elements 16 of the mould, on which the flexible and leak tight walls apply pressure, are in the direction parallel to the inside faces 16a of these elements, in other words parallel to the sides of the part.

Figure 3:
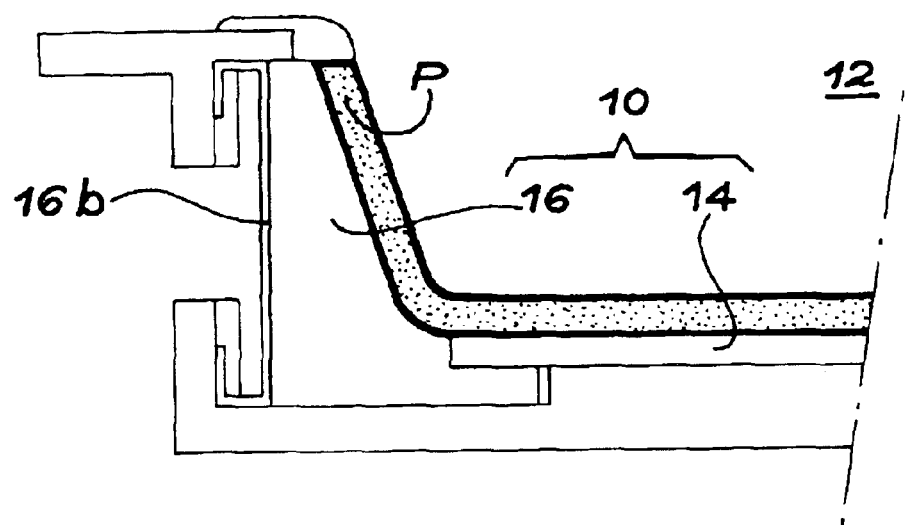
FIG. 3 is a diagrammatic cross-sectional view illustrating a variant embodiment of the tooling, applied to the production of a U or L-shaped part with an open side.

As illustrated diagrammatically in FIG. 3, the part P to be made may also have at least one open side or edge, in other words that forms an obtuse angle with the bottom. In this case, the outside face 16b of the end element 16 corresponding to the mould 10 will advantageously have the same orientation as above, in other words perpendicular to the bottom of the part or the central element 14 of the mould.

Note that a part with an open flange as shown in FIG. 3 can also be made using tooling identical to that described above with reference to FIGS. 1 and 2, and inserting a counter form between the end element 16 corresponding to the mould 10 and the open flange of the part.

In each of the two cases mentioned above, in other words when it is required to make a part P with an open flange, the outside surface 16b of the corresponding end element 16 of the mould, that resists the pressure of the flexible and leak tight wall 36, may also be oriented parallel to the corresponding inside surface 16a of the cavity 12, formed either directly on the end element 16 or inside the counter mould, depending on the case.

Figure 4:
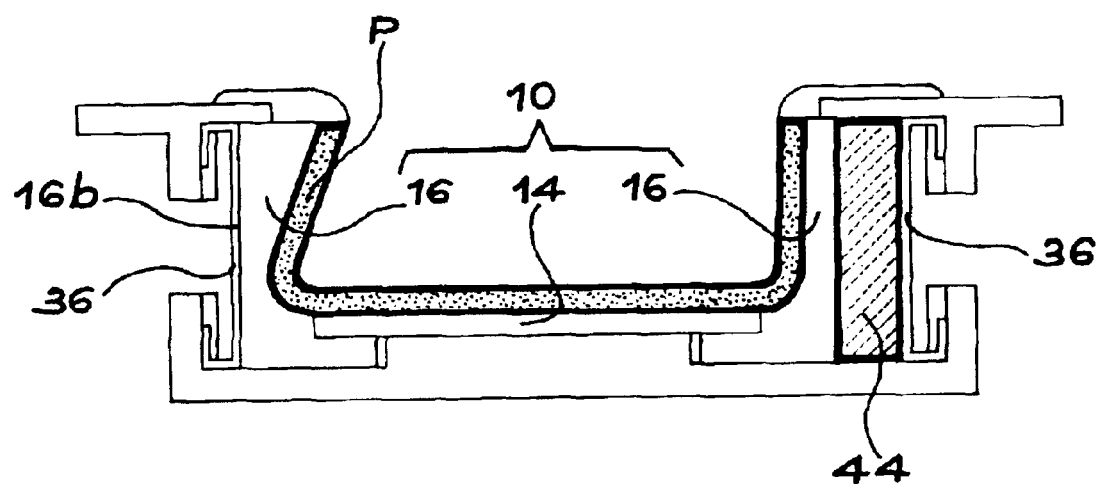
FIG. 4 is a diagrammatic sectional view similar to FIG. 3, illustrating a variant embodiment of the tooling applied to the manufacture of a U-shaped part with a closed side.

As illustrated diagrammatically in FIG. 4, tooling conform with the invention may also be used to make a profiled part P comprising at least one closed flange or edge, in other words forming an acute angle with the bottom. In this case, the outside surface 16b of the end element 16 of the mould 10 corresponding to this closed edge preferably remains perpendicular to the bottom of the part, in other words to the central element 14.

In order to enable the part to be removed from its mould, a key 44 is advantageously fitted to the tooling, the key having a rectangular section and that is inserted between the end element 16 of the mould and the corresponding flexible and leak tight wall. When the tooling is cooled, this key 44 is removed so that the end elements 16 of the mould can be separated sufficiently to enable the part P thus obtained to be extracted upwards.

Figure 5:
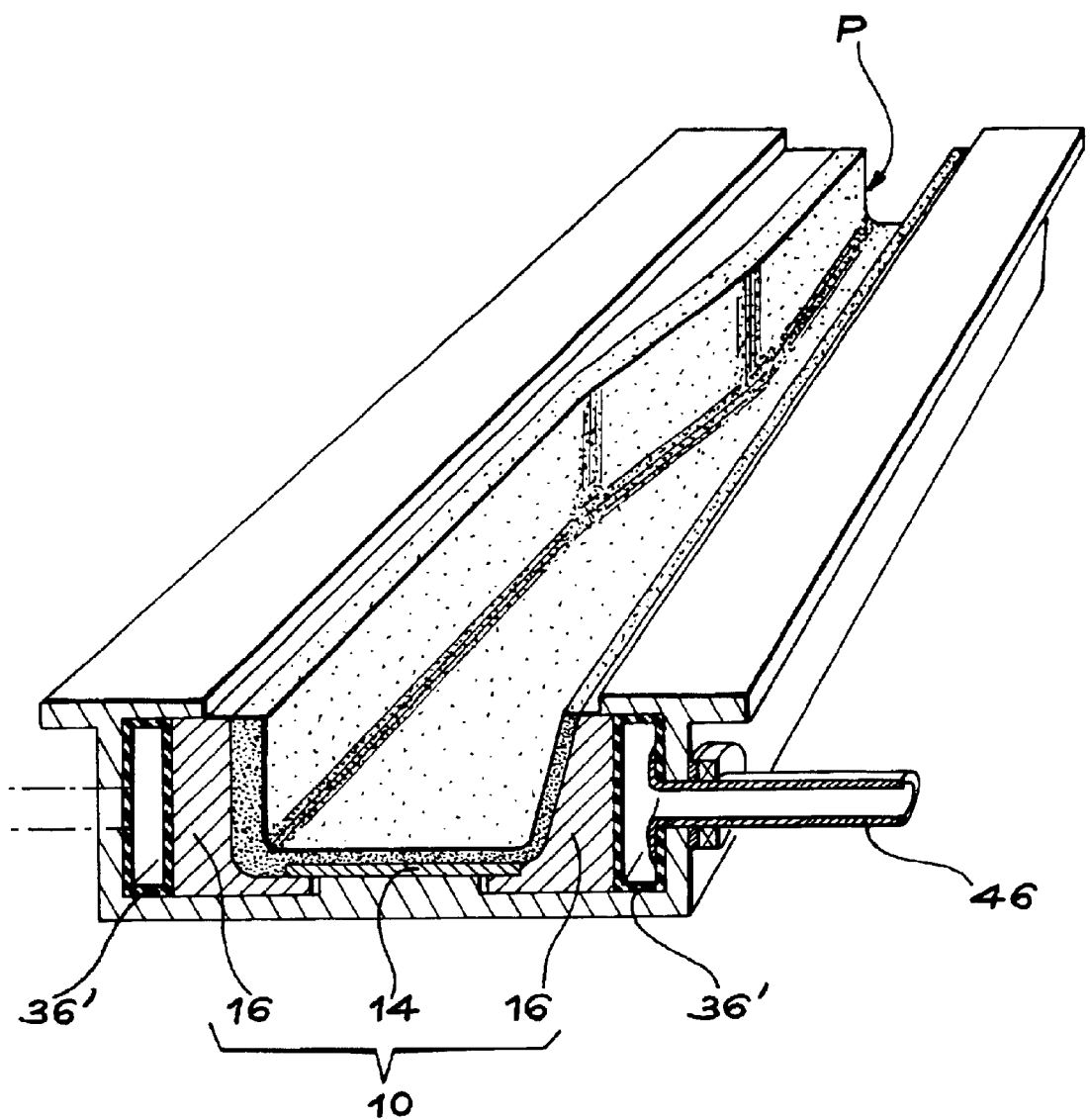
FIG. 5 is a perspective view illustrating another embodiment of the tooling according to the invention applied to the manufacture of a U-shaped part with a variable section in which the flexible walls of the tooling are replaced by leak tight bladders connected to an independent external pressure source.

As shown also in FIG. 5, the tooling according to the invention can also be used to make a part P with one or several reinforced and thicker parts, for example on one of its sides.

Similarly, instead of having a uniform cross-section with constant dimensions from one end to the other as in the previous embodiments, the parts to be made may have a variable or changing cross-section without going outside the framework of the invention. This result may easily be obtained by using an appropriate shape and dimensions for one or more of the 10 elements 14 and 16 forming the mould 10.

As shown also in FIG. 5, if the pressure inside the autoclave is not sufficient to keep the different elements forming the mould in contact throughout the polymerisation cycle, it would be possible to replace the flexible leak tight walls 36 by leak tight bladders 36' each delimiting a closed space that could be connected to an external pressure source (not shown) through an appropriate tube 46.

When flexible walls 36 affected by the pressure inside the autoclave are used, these walls can be attached to the envelope 20 in any manner without going outside the framework of the invention. Thus, in particular the sidewalls 22 of the envelope 20 may be eliminated. The flexible leak tight walls 36 are then fixed directly to the bottom 21 and the top wall 23 of the envelope 20, and on parts (not shown) connecting the bottom to the top wall at each end of the tooling.

Note that the tooling according to the invention can also be used to make parts that do not have a U-shaped cross-section, for example parts with an L-shaped cross-section. The number of elements making up the mould 10 can then be reduced to two, and the number of parts in the pressure application means 36 can also be reduced to two. Furthermore, seals may be inserted if necessary between edges of the different elements of the mould that are normally in contact, to prevent penetration of resin between these elements at the time of polymerisation.

What is claimed is:

1. Shaping tool for the polymerisation of profiled parts made of a composite material, comprising:
    a rigid mould (10), and shaping means (24) suitable for pushing a part blank (E) into contact with the rigid mould, the tooling being characterized in that the rigid mould (10) is formed of several elements (14, 16) without any connection between them, holding means (36, 36') being provided to keep the said elements normally in contact with each other so as to define a cavity (12) inside which the part blank (E) can be fitted, while enabling the said elements (14, 16) to separate during a cool phase following polymerisation of the blank;
    the holding means having means (36, 36') of applying a pressure on an outside face (16b) of at least one (16) of the elements in order to move it towards an adjacent element (14); and
    said outside face (16b) is approximately parallel to an inside face (16b) delimiting the cavity (12) from the element (16) on which it is formed, or from a counter-formed placed inside this element;
    wherein the elements (14, 16) of the rigid mould (10) are placed inside a rigid envelope (20) and the pressure application means include at least one flexible wall (36) connected in a leak tight manner on the envelope (20) and that can be forced into contact with the said external face (16b) by applied pressure.

2. Tooling according to claim 1, in which the elements (14, 16) of the rigid mould (10) are placed in a rigid envelope (20) and the means of applying the pressure include at least one leak tight bladder (36') bearing on the envelope (20) and that is forced into contact with the said outside face (16b) by applied pressure.

3. Tooling according to claim 1, in which the rigid mould (10) forms a cavity (12) with a U-section and has a central element (14) materialising the bottom of the cavity and two end elements (16) materializing the sides of the cavity, the holding means (36) normally keeping the end elements in contact with the side edges (14b) of the central element (14).

4. Tooling according to claims 1, in which the means of applying pressure comprise two flexible wails (36) that can be forced into contact with the said external faces (16b) of each of the end elements (16), by applied pressure.

5. Tooling according to claim 2, in which the means of applying pressure comprise two leak tight bladders (36') that can be applied in contact with the said outside faces (16b) of each of the end elements (16), under the effect of the pressure output by an external pressure source.

6. Tooling according to claim 1, in which the cross-section of the cavity (12) in uniform along its entire length.

7. Tooling according to claim 1 in which the cross-section of the cavity (12) is variable from one end to the other.

8. Tooling according to claim 2, in which the rigid mould (10) forms a cavity (12) with a U-section and has a central element (14) materializing the bottom of the cavity and two end elements (16) materializing the sides of the cavity, the holding means (36) normally keeping the end elements in contact with the side edges (14b) of the central element (14).

9. Tooling according to claim 3, in which the means of applying pressure comprise two flexible walls (36) that can be forced into contact with the said external faces (16b) of each of the end elements (16), by applied pressure.

10. Tooling according to claim 5, in which the cross-section of the cavity (12) is uniform along its entire length.

11. Tooling according to claim 3, in which the means of applying pressure comprise two leak tight bladders (36') that can be applied in contact with the said outside faces (16b) of each of the end elements (16), under the effect of the pressure output by an external pressure source.

12. Tooling according to claim 5, in which the cross-section of the cavity (12) is variable from one end to the other.

13. Shaping tool for the polymerisation of profiled parts made of a composite material, comprising:
    a rigid mould (10), and shaping means (24) suitable for pushing a part blank (E) into contact with the rigid mould, the tooling being characterized in that the rigid mould (10) is formed of several elements (14, 16) without any connection between them, holding means (36, 36') being provided to keep the said elements normally in contact with each other so as to define a cavity (12) inside which the part blank (E) can be fitted, while enabling the said elements (14, 16) to separate during a cool phase following polymerisation of the blank;
    wherein the mould comprises at least one central element and two end elements, said central element having abutment surfaces for said end elements and said holding means urging said end elements against said abutment surfaces, independently of said shaping means.

* * * * *